United States Patent
Burdo et al.

(10) Patent No.: US 8,290,511 B2
(45) Date of Patent: Oct. 16, 2012

(54) VENUE APPLICATION FOR MOBILE STATION POSITION ESTIMATION

(75) Inventors: Rinat Burdo, La Jolla, CA (US); Saumitra Mohan Das, San Jose, CA (US); Rajarshi Gupta, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 12/894,981

(22) Filed: Sep. 30, 2010

(65) Prior Publication Data

US 2011/0081918 A1    Apr. 7, 2011

Related U.S. Application Data

(60) Provisional application No. 61/247,873, filed on Oct. 1, 2009, provisional application No. 61/322,559, filed on Apr. 9, 2010.

(51) Int. Cl.
*H04W 64/00* (2009.01)

(52) U.S. Cl. .................................... 455/456.1; 701/434

(58) Field of Classification Search .................. 455/414, 455/456, 457; 701/434–469; 340/572, 995
See application file for complete search history.

(56) References Cited

U.S. PATENT DOCUMENTS

| | | | |
|---|---|---|---|
| 7,496,445 B2 | 2/2009 | Mohsini et al. | |
| 2006/0167628 A1* | 7/2006 | Karaoguz et al. | 701/211 |
| 2006/0247849 A1* | 11/2006 | Mohsini et al. | 701/206 |
| 2007/0001904 A1* | 1/2007 | Mendelson | 342/450 |
| 2007/0069923 A1 | 3/2007 | Mendelson | |
| 2008/0070593 A1* | 3/2008 | Altman et al. | 455/457 |
| 2009/0043502 A1* | 2/2009 | Shaffer et al. | 701/213 |
| 2009/0157302 A1 | 6/2009 | Tashev et al. | |
| 2009/0177603 A1* | 7/2009 | Honisch | 706/45 |
| 2010/0121567 A1* | 5/2010 | Mendelson | 701/206 |

FOREIGN PATENT DOCUMENTS

JP    2003099433    4/2003

OTHER PUBLICATIONS

Gressmann, Bjorn; Klimek, Helge; Turau, Volker: Institute of Telematics, "Towards Ubiquitous Indoor Location Based Services and Indoor Navigation," Hamburg University of Technology, Hamburg, Germany, {gressman, helge. klimek, turau} @tu-harburg.de, Mar. 11-12, 2010.

International Search Report and Written Opinion—PCT/US2010/051223, International Search Authority—European Patent Office—Mar. 1, 2011.

* cited by examiner

*Primary Examiner* — Kamran Afshar
*Assistant Examiner* — Kashif Siddiqui
(74) *Attorney, Agent, or Firm* — Arnold J. Gum

(57) ABSTRACT

Disclosed is a method, and a system to perform the method, comprising receiving venue infrastructure information at an entity hosted on a mobile station, and selectively providing a portion of the venue infrastructure information to one or more other entities hosted on the mobile station based, at least in part, on a privilege level attributed to the mobile station or a user associated with the mobile station.

22 Claims, 5 Drawing Sheets

VENUE APPLICATION FOR MOBILE STATION POSITION ESTIMATION

CROSS-REFERENCE(S) TO RELATED APPLICATION(S)

The present application claims priority to U.S. Provisional Application Ser. No. 61/247,873, entitled "Venue Map Applications," filed on Oct. 1, 2009 and U.S. Provisional Application Ser. No. 61/322,559, entitled "Managed Indoor LBS in Sensitive Deployment Venues," filed on Apr. 9, 2010, which are assigned to the assignee hereof and which is expressly incorporated herein by reference.

BACKGROUND

1. Field

Subject matter disclosed herein relates to a venue application for use in mobile station position estimation.

2. Information

The Global Positioning System (GPS) and other like satellite positioning systems have enabled navigation services for mobile handsets in outdoor environments. Since satellite signals may not be reliably received and/or acquired in an indoor environment, different techniques may be employed to enable navigation services. For example, mobile stations can typically obtain a position fix by measuring ranges to three or more terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, signal strength and/or round trip delay.

In some implementations, an indoor navigation system may provide a digital electronic map to mobile stations upon entry to a particular indoor area. Such a map may show indoor features such as doors, hallways, entry ways, walls, etc., points of interest such as bathrooms, pay phones, room names, stores, etc. Such a digital electronic map may be stored at a server to be accessible by a mobile station through selection of a universal resource locator (URL), for example. By obtaining and displaying such a map, a mobile station may overlay a current location of the mobile station (and user) over the displayed map to provide the user with additional context. Using map information indicating routing constraints, a mobile station may also apply location estimates to estimating a trajectory of the mobile station in an indoor area subject to the routing constraints.

SUMMARY

In one particular implementation, venue infrastructure information is received at an entity hosted on a mobile station. Portions of the venue infrastructure information are selectively provided to one or more other entities hosted on the mobile station based, at least in part, on a privilege level attributed to the mobile station or user associated with the mobile station. It should be understood, however, that this is merely an example implementation and that claimed subject matter is not limited in this respect.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
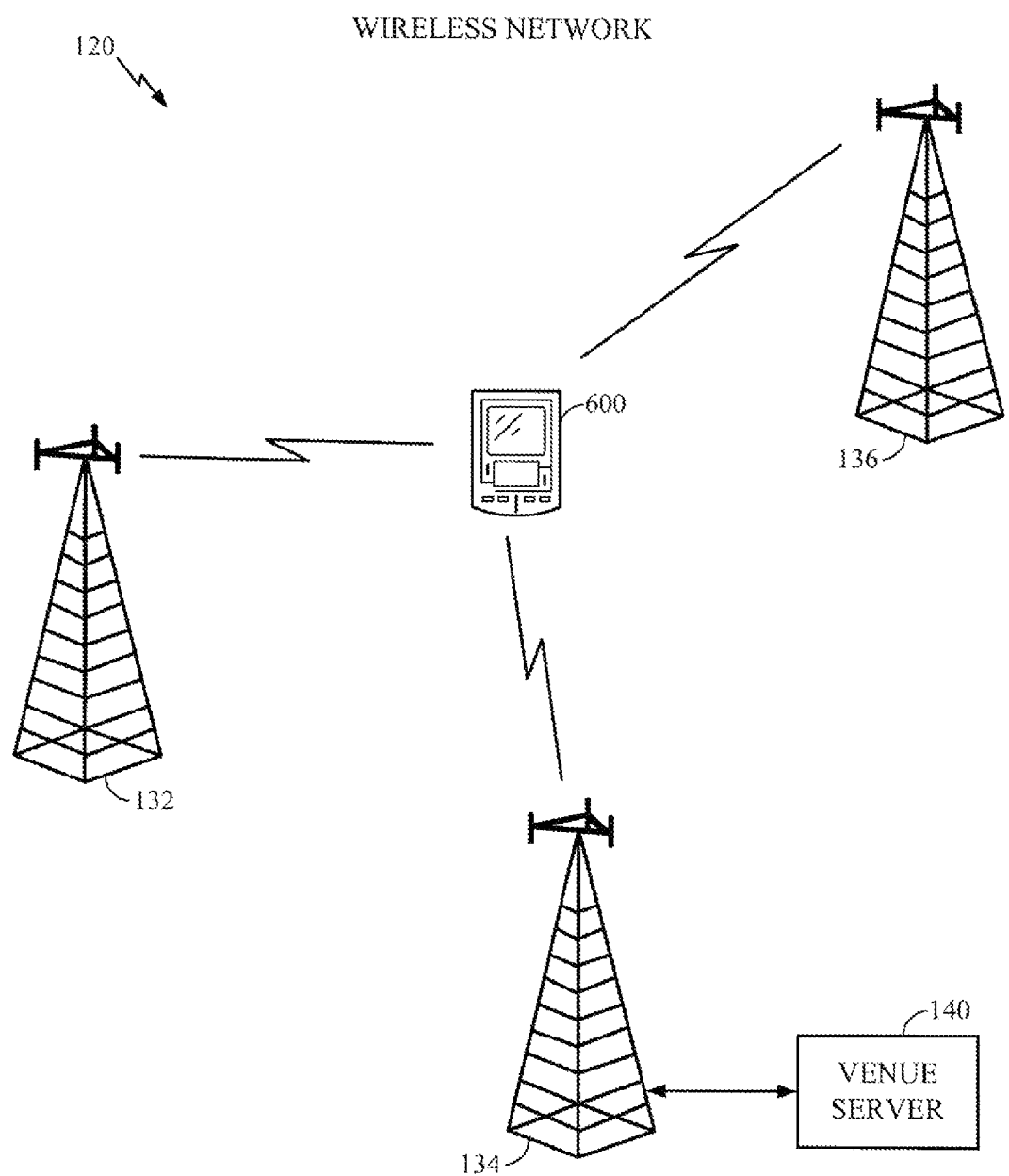
FIG. 1 is a schematic block diagram depicting an example mobile station in communication with an example wireless communication network in accordance with an implementation.

To enable a mobile station to provide location services in an indoor area (e.g., location estimation, trajectory estimation, navigation, etc.) a venue operator may provide mobile stations with venue infrastructure information such as, for example, venue-map information (e.g., a digital map with associated metadata such as points of interest), information descriptive of locations of radio frequency (RF) beacon transmitters (e.g., wireless access points) or their propagation signatures, heatmap or radiomap data associating expected received signal characteristics with locations in a venue, information descriptive of routeability graphs of feasible/navigable areas, just to name a few examples. In particular implementations, a party providing venue infrastructure information, such as a venue operator, may wish to control and/or restrict access to such venue-map and/or associated infrastructure information (such as locations of RF beacon transmitters). For example, such a venue operator may wish to restrict access in accordance with a security policy and/or monetization model. Here, a mobile station may host an entity to restrict such access. In one example, a venue operator may provide a venue-secured application that is to be hosted on a mobile station to access venue-map and/or associated infrastructure information from a location server through a wireless communication link. In this context, a venue operator may include any one of several parties such as, for example, an owner of a business, government agency, proprietor, party contracted to provide management of a facility, school, just to name a few examples. In another example implementation, a system service (e.g., a location engine system service) hosted on a mobile station may restrict access to venue infrastructure information.

In a particular example, a venue operator may make a venue-secured application available for use by mobile stations travelling in an area of interest to the venue operator. In one implementation, a venue-secured application may be downloaded and/or launched to a mobile station using any one of several well known techniques such as selection of a URL from the mobile station. The launched venue-secured application may then communicate with a venue server to receive venue infrastructure information. In a particular implementation, a venue-secured application may control, restrict or prevent dissemination of information received from such a venue server to other entities hosted on the mobile station such as applications, system services (e.g., a location engine service), just to name a few examples. In one implementation, a location engine service may be capable of performing one or more functions in support of location services such as measuring ranges to RF beacon transmitters from signal characteristics, estimating locations of the mobile station and/or estimating a trajectory over feasible paths in a digital map, just to name a few examples. In this particular example, the venue-secured application hosted on a mobile station may provide different levels of access to venue-map and/or infrastructure information based, for example, on a privilege level attributed to a mobile station and/or associated user of the mobile station and/or privilege levels of other applications hosted on the mobile station. As discussed below, such a privilege level may be determined based one or more criteria such as, for example, according to a monetization and/or subscription model, customer loyalty (e.g., quantified by purchase "points"), classification of a role within an enterprise or organization, and/or other particular attributes of a user (e.g., age, gender, birth date, place of residence, employer, etc.), just to name a few example criteria that may be used in mapping a particular privilege level to a mobile station and/or user of such a mobile station. In a particular example implementation, such a privilege level may be associated with a particular application hosted on the mobile device.

While particular implementations are directed to providing venue infrastructure information to an entity hosted on a mobile station from a venue operator, such venue infrastructure information may be provided by any one of several different parties such as, for example, a service provider not tied to any particular vendor, equipment manufacturer, information technology contractor, map aggregator, peer device, third party intermediary, just to name a few examples.

FIG. 1 is a schematic block diagram of a wireless network 120 in communication with a mobile station 600. Wireless network 120, for this example, may provide voice or data communication for a number of wireless terminals including mobile station 600, for example, and may further support initial position estimation for the wireless terminals in addition to providing voice or data communication. Wireless network 120 may comprise any of a number of wireless network types, several examples of which are described below. Wireless network 120 for this example comprises terrestrial-based wireless access points 132, 134, and 136 that provide communication for a number of mobile stations such as, for example, mobile station 600. For simplicity, only a few wireless access points 132, 134, and 136 are depicted and one mobile station 600 is depicted in FIG. 1. Of course, other examples may include a smaller or greater number of transmitters, and the configuration of transmitters depicted in FIG. 1 is merely an example configuration.

In an aspect, mobile station 600 may obtain one or more measurements from one or more signals received from transmitters at one or more of wireless access points 132, 134, and 136. Mobile station 600 may gather propagation delay information or signal strength information through communication with one or more of wireless access points 132, 134, and 136. Using such gathered information, mobile station 600 may compute an estimate for the position of mobile station 600 through trilateration based, at least in part, on timing calibration parameters such as round trip delay or code phase detections, signal strength estimates, or other measurements obtained through communication with one or more of wireless access points 132, 134, or 136, and further based, at least in part, on known or reported locations of wireless access points 132, 134, or 136.

As an alternative to trilateration, a mobile station may associate characteristics of received/acquired signals with expected signal characteristics at different location points of a venue in "heatmap" or "radiomap" data to estimate a location of the mobile station using well known techniques. Such expected signal characteristics may include, for example, receive signal strength and/or round trip delay associated with MAC addresses of transmitters transmitting the received signals.

In an aspect, one or more of wireless access points 132, 134, and 136 may further couple mobile station 600 to one or more other systems and networks, such as, for example, a public switched telephone network (PSTN), a local area network (LAN), and/or a wide area network such as the Internet, to name merely a few examples. For the example depicted in FIG. 1, mobile station 600 may communicate with a venue server 140 through a network by way of transmitter 134. In addition, mobile station 600 may communicate with venue server 140 through a LAN or a wide area network. As such, venue server 140 may be accessible by mobile station 600 using well known Internet protocols and need not be physically located at any particular venue. In a particular implementation, venue server 140 may communicate with mobile stations to provide information to assist mobile stations in navigation operations while mobile stations located in a particular venue area being covered by venue server 140. Such a venue area may comprise, for example, an indoor environment such as an office building, airport, school, museum, shopping mall, just to name a few examples. Information provided to such mobile stations may include, for example, digital venue maps that may be displayed on a mobile station, locations of points of interest overlaid on such venue maps, information to assist mobile stations in computing position estimates including, for example, known locations of transmitters (e.g., transmitters on wireless access points), identification information associated with such transmitters (e.g., MAC addresses that may be determined from acquisition of signals transmitted by such transmitters) and/or other information enabling a mobile station to obtain measurements of ranges to transmitters at known locations, just to provide a few examples.

In a particular implementation, and as pointed out above, a venue-secured application hosted on a mobile station may control and/or restrict dissemination of venue infrastructure information to other entities (e.g., applications and system services) hosted on the mobile station such as couponing application or a location engine service. Here, such a location engine service may be capable of performing one or more functions in support of location services such as measuring ranges to RF beacon transmitters from signal characteristics and estimating locations of the mobile station based, at least in part, on the measured ranges and known locations of the RF beacon transmitters. In an alternative implementation, a location engine service or other application may further process estimated locations to estimate a trajectory over feasible paths in a digital map such as digital map of an indoor venue. In a particular implementation, such feasible paths may be determined a priori according to a routability graph expressed as metadata in a digital map stored in an electronic medium, for example.

In an aspect, locations of one or more wireless transmitters in a wireless system such as wireless network 120 may be known at a mobile station such as mobile station 600. For example, such locations may be forwarded to mobile station 600 by venue server 140 with the locations provided by the transmitters themselves. Alternatively, heatmap or radiomap information including expected signal characteristics (e.g., received signal strength or round trip delay) at specific locations in an area of interest may be forwarded to mobile station 600.

Figure 2:
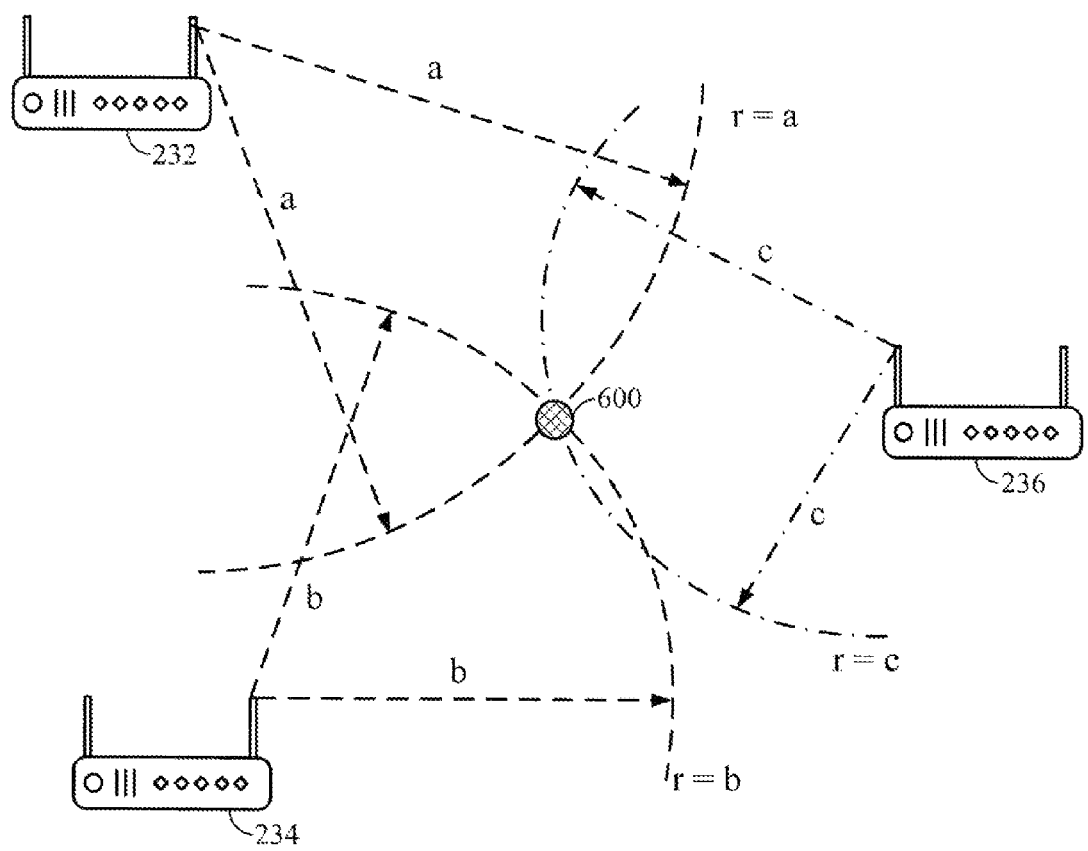
FIG. 2 is a schematic block diagram depicting an example trilateration technique for determining an estimated position for a mobile station in accordance with an implementation.

FIG. 2 depicts an example trilateration technique for estimating a position of mobile station 600. For the present example, mobile station 600 may receive wireless signals from a number of transmitters and/or RF beacons. In this example, access points 232, 234, and 236 are shown. In other examples, mobile station 600 may receive wireless signals from a greater or smaller number of transmitters and/or RF beacons. In an aspect, to perform a trilateration position estimate, signals from three or more transmitters and/or RF beacons may be received. In general, the closer a receiving device is to the transmitting device, the stronger the received signal strength, for example. Here, a mobile station in relatively close proximity to a transmitter and/or RF beacon may expect to receive a signal of relatively high signal strength from the transmitter and/or RF beacon, and a mobile station located a greater distance from the transmitter and/or RF beacon may expect to receive a signal of lower signal strength. Various mathematical models may be utilized to estimate a range between a mobile station and a transmitter and/or RF beacon, and the scope of claimed subject matter is not limited in this respect.

Although examples described herein discuss measuring ranges between transmitting devices and receiving devices based at least in part on signal strength, the scope of claimed subject matter is not limited in this respect. Measuring ranges between transmitting devices and receiving devices based at least in part on signal strength is merely one example technique for estimating and/or measuring such ranges. Other techniques may include, for example, measuring and/or estimating such ranges based at least in part on signal phase and/or signal timing. Again, the scope of claimed subject matter is not limited in these respects. Also, as discussed above, a location of a mobile station may also be estimated by matching received signal characteristics with signatures in heatmap or radiomap data associated with specific locations.

Figure 3:
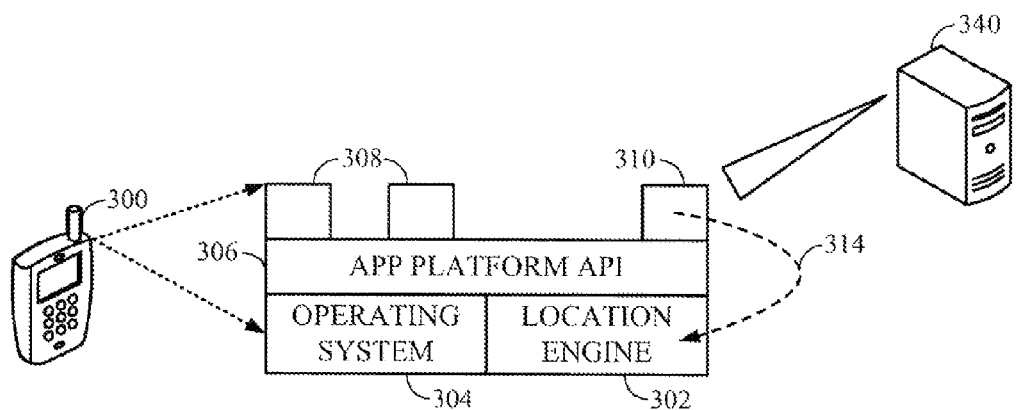
FIG. 3 is a schematic diagram of an application processing stack hosted on a mobile station in communication with a venue server in accordance with an implementation.

FIG. 3 is a schematic diagram of an application processing stack hosted on a mobile station in communication with a venue server in accordance with an implementation. Mobile station 300 (referred to above as mobile station 600) may comprise one or more application processors (not shown) capable of executing machine-readable instructions stored in memory (not shown) to enable execution of any one of several applications 308 and 310. Such applications may include, for example, voice communication, data communication (e.g., email, text messaging, access to the world wide web), audio storage and playback, location based services, just to name a few examples.

The one or more application processors of mobile station 300 may host an operating system 304 such as Android™ by Google Inc., iOS™ by Apple Inc., PNP BREW by Qualcomm Inc. or Windows Phone™ by Microsoft Inc., just to name a few examples. In addition, the one or more application processors may host a location engine 302 that performs one or more functions including, for example, computing estimates of a current location of mobile station 300 (e.g., by obtaining a position fix by trilateration to terrestrial transmitters and/or obtaining position fix from a global navigation satellite system (GNSS) such as GPS), estimating a trajectory of mobile station 300 over a venue map (e.g., using a Kalman filter, extended Kalman filter, particle filter according to a predetermined routeability graph, etc.).

In a particular example, location engine 302 may be capable of performing one or more functions in support of location services such as measuring ranges to RF beacon transmitters based on received signal characteristics, estimating locations of the mobile station, determining a building floor where the mobile station is located and/or estimating a trajectory over feasible paths in a digital map. As discussed below, instead of location engine 302 being hosted on an application processor, in an alternative implementation a location engine service may be hosted at least in part on a modem processor (not shown).

Operating system 304 and location engine 302 communicate with applications 308 and 310 via an application platform application programming interface (API) 306. In a particular implementation, application platform API 306 may define common variables, routines, data structures, object classes and/or protocols enabling applications (e.g., applications 308 and 310) to communicate with hardware elements and platform services (e.g., location services) of mobile station 300. In a particular implementation, an "application" as referred to herein relates to a hosted entity that provides functionality to a mobile station for performing specific tasks as perceived by a user. For example, as discussed above, an application may communicate with an operating system and/or other entities though an API such as application platform API 306. Some applications may be selectively installed or removed using well known techniques. A "system service" as referred to herein relates to an entity hosted on a mobile station as a resource to other entities (e.g., applications). In the example implementation of FIG. 3, a location engine 302 comprises a system service which may be accessible by one or more applications through application platform API 306. In a particular implementation, a system service may interact with one or more hardware elements to provide data to be accessible by applications through an API. Another example, of a system service may comprise an inertial navigation systems service that communicates with inertial sensors to process sensor measurements to provide data for use by applications. It should be understood, however, that these are merely examples of a system service according to particular implementations, and that claimed subject matter is not limited in this respect.

In a particular implementation, applications 308 and 310 may communicate with venue server 340 through a wireless communication network as discussed above. In particular, application 310 comprises a venue-secured application that communicates with venue server 340 to obtain information to assist in providing location based services. In one implementation, venue-secured application 310 may be downloaded and/or launched to mobile station 300 using any one of several well known techniques such as selection of a URL from mobile station 300. In another example, venue-license application 310 may pre-installed with mobile station 300 at a factory. It should be understood, however, that these are merely examples of how a venue-secured application may be installed and launched to a mobile station, and claimed subject matter is not limited in these respects.

In one particular implementation, venue-secured application 310 may push venue infrastructure information through application platform API 306 to location engine 302, as indicated by arrow 314. Such information may include information descriptive of locations of one or more RF beacon transmitters or a signal heatmap of expected signal characteristics of signals received from such RF beacon transmitters at specific locations in a venue. In a particular implementation where such RF beacon transmitters are provided by wireless access points to a communication network, such information descriptive of locations of access points may be provided in a data structure that associates MAC addresses of such access points with information descriptive of the locations of the access points (e.g., according to a local or global coordinate system). However, this is merely an example of how a venue-secured application may provide venue infrastructure information according to a particular implementation and claimed subject matter is not limited in this respect.

In one particular implementation, a venue operator may receive revenue from mobile station users in exchange for providing location based services facilitated by venue server 340 in communication with venue-secured application 310. For example, a venue operator may charge a one-time fee from a mobile station user in exchange for being able to host the venue-secured application 310 on the mobile station. In one alternative, a venue operator may allow installation of venue-secured application 310 for free, allow basic service for free, and charge a fee for premium service. In another alternative, a venue operator may bill a fee to a mobile station user for each use of a location based service offered through venue-secured application 310. In another implementation, venue-secured application may push advertising for display on mobile station 300.

In another implementation, venue-secured application 310 may, as a precondition to providing a location based service, receive password information at a user interface. The password information may then be forwarded to venue server 340 for authentication prior to providing a location based service. In an alternative implementation, venue-secured application 310 may tender a digital certificate to venue server 340 for initiating a secure session between venue-secured application 310 and venue server 340. It should be understood, however that these are merely examples of how access to location based services may be controlled by a venue-secured application and claimed subject matter is not limited in this respect.

In a particular implementation, venue-secured application 310 may control and/or restrict dissemination of venue infrastructure information to other entities hosted on mobile station 300 such as other applications 308 and/or location engine 302. In this regard, venue-secured application 310 may act as an agent of venue server 340 in controlling dissemination of information received from venue server 340 to other entities hosted on mobile station 300 (such as other applications 308). In this particular example, venue-secured application 310 and venue server 340 may communicate over a secured channel using any one of several encryption techniques, for example. Also, venue-secured application 310 may provide different levels of access to venue-map and/or infrastructure information based, for example, on a privilege level associated with mobile station 300 and/or associated user of mobile station 300. In one implementation, a particular privilege level may be determined based, at least in part, on whether a user associated with mobile station 300 is a paid user, employee, customer, guest, manager, just to name a few examples.

As discussed above, a mobile station may estimate its position using trilateration by obtaining measurements to RF beacon transmitters (e.g., access points) with knowledge of locations of the RF beacon transmitters or matching received signal characteristics with heatmap or radiomap data. In one particular case, venue-secured application 310 may receive from venue server 340 venue-map information and locations of RF beacon transmitters positioned in a particular area, and allow location engine 302 access to information descriptive of locations of RF beacon transmitters and venue-map information. Accordingly, location engine 302 can obtain position estimates using through trilateration based on knowledge of locations of the RF beacon transmitters or application of received signal characteristics to heatmap data, and apply the obtained position estimates to received venue-map information to estimate a trajectory of mobile station 300 in the indoor area. It should be noted that in this particular case, venue-secured application 310 allows location engine 302 to have complete access to locations of RF beacon transmitters or signal heatmap/radiomap data, and venue-map information. In one particular implementation, application platform API 306 may include a special secure portion that facilitates communication between location engine 302 and venue-secured application 310. For example, secure information in common variables defined by application platform API 306 may be encrypted and be selectively de-encrypted by venue-secured application 310 based upon whether other applications 308 are to have access to such secure information. Here, venue-secured application 310 may identify mobile station 300 and/or a user associated with mobile station 300 as having a high or highest privilege level to have such complete access.

In another particular case, venue-secured application 310 may allow location engine 302 access to information descriptive of locations of RF beacon transmitters or signal heatmap/radiomap data, but not allow location engine 302 access to venue map information as this information is to be maintained in privacy according to a policy. The venue-secured application itself may perform trajectory estimation instead of location engine 302 performing this function. In one implementation, venue-secured application 310 may "push" a data structure to location engine 302 through application platform API 306 identifying RF beacon transmitters by MAC addresses (e.g., in the case of access points) and associating location information with such MAC addresses. Alternatively, such MAC addresses may be associated with heatmap or radiomap data comprising expected signal characteristics received at particular locations in a venue from transmitters associated with the MAC addresses. Location engine 302 may then use such knowledge of locations of the RF beacon transmitters to obtain position estimates (e.g., using trilateration applying received signal characteristics to heatmap data as discussed above), and venue-secured application 310 may perform trajectory estimation by applying position estimates (obtained from location engine 302) to venue map information that is privately maintained by venue-secured application 310.

In yet another particular case, venue-secured application 310 may not permit location engine 302 to receive or access either venue-map information or locations of RF beacon transmitters. Here, location engine 302 may still provide to venue-secured application 310 range measurements to RF beacon transmitters (e.g., associated with MAC addresses of wireless access points providing such RF beacon transmitters) based upon received signal strength, round-trip delay, and/or the like. Venue-secured application 310 may then use trilateration compute estimates of location of mobile station 300 based upon such range measurements determined by location engine 302 and locations of the associated RF beacon transmitters obtained from venue server 340. Venue-secured application 310 may then apply such estimates of location of mobile station 300 to venue-map information for estimating a trajectory of mobile station 300 in an indoor area, for example.

The above examples relate to control and/or restriction of access to venue-map information and/or locations of RF beacon transmitters. In other implementations, other types of information may be restricted and/or controlled by a venue-secured application such as, for example information indicating points of interest, granularity of venue-map information, etc.

Figure 4:
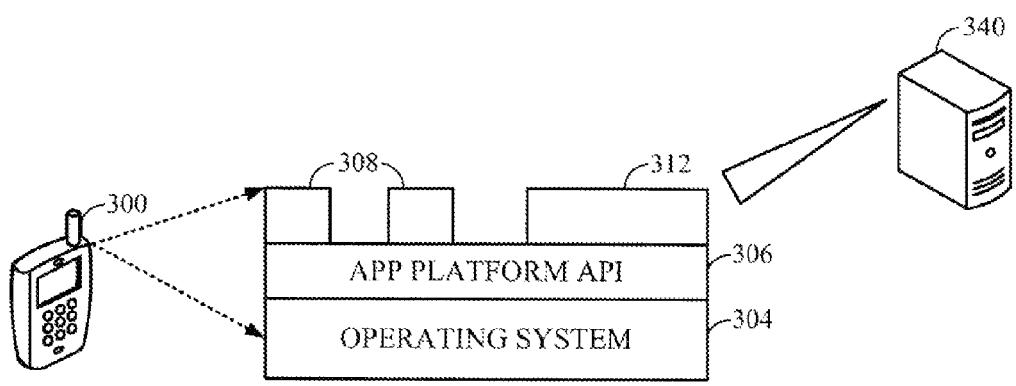
FIG. 4 is a schematic diagram of an application processing stack hosted on a mobile station in communication with a venue server in accordance with an alternative implementation.

FIG. 4 is a schematic block diagram illustrating an example alternative implementation of mobile station 300 in which a location engine is integrated with a venue-secured application 312. As discussed above with reference to FIG. 3, venue-secured application 312 may communicate with venue server 340, and control dissemination of information (such as locations of RF beacon transmitters and venue map information) to other entities hosted on mobile station 300.

In a particular implementation, venue-secured application 310 may securely maintain, and control access to, information received from venue server 340 using any one of several techniques. For example, venue-secured application 310 may store associated application data in an encrypted format, such as secure hash key encryption, just as an example. Alternatively, such application data may be stored in a compressed format with password protection where application 310 knows the password. In yet another alternative, access to such application data may be protected using secure hardware memory. It should be understood, however, that these are merely examples of how one application hosted on an API may securely maintain and control access to information according to particular implementations, and claimed subject matter is not limited in this respect.

While particular implementations discussed above are directed to controlling dissemination of venue infrastructure information at a venue-secured application, other implementations may control dissemination of such venue infrastructure information using a system service such as a location engine service. As discussed above, such a system service may communicate with a venue server over a secured wireless link to receive venue infrastructure information, and selectively disseminate such received venue infrastructure information to other entities hosted on the mobile device (e.g., mapping applications, etc.). Here, such a system service may also maintain received venue infrastructure information in a secure manner and apply preconditions before disseminating the venue infrastructure information or rendering a service using same. For example, as discussed above, a system service may receive password information provided at a user interface and provide such password information to a venue server for authentication/authorization. Alternatively, the system service may tender a digital certificate to a venue server for establishing a secure session between the system service and the venue server. It should be understood, however, that this is merely an additional example of how an entity hosted on a mobile device may control access to location services and related information, and claimed subject matter is not limited in this respect.

Figure 6:
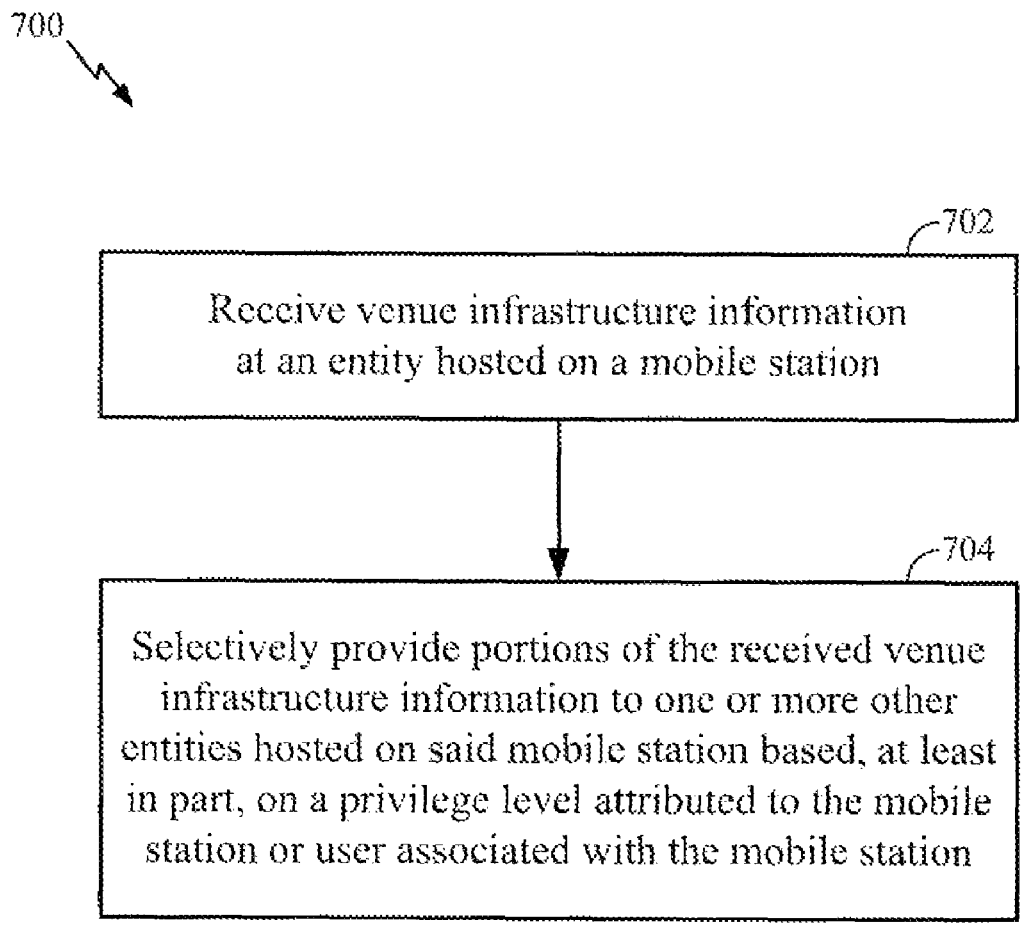
FIG. 6 is a flow diagram of a process for controlling access to venue infrastructure information according to an implementation.

To recap a particular implementation, FIG. 6 is a flow diagram of a process that may be performed by an entity hosted on a mobile station (such as a venue-secured application or system service) according to an implementation. At step 702, venue infrastructure information may be received from a venue server. As discussed above such venue infrastructure information may include, for example, venue-map information (e.g., a digital map with associated metadata such as points of interest), information descriptive of locations of radio frequency (RF) beacon transmitters (e.g., wireless access points) or their propagation signatures, information descriptive of routeability graphs of feasible/navigable areas, just to name a few examples. Additionally, such venue infrastructure information may be received at a mobile station over a secure wireless link. At step 704, portions of the received venue infrastructure information may be selectively provided to entities on the mobile station (e.g., other applications, system services, etc.) based, at least in part on a privilege level attributed to the mobile station or a user associated with the mobile station. It should be understood, however, that this is merely an example implementation and that claimed subject matter is not limited in this respect.

As pointed out above, different mobile stations may be provided with different levels of access based, at least in part, on different classifications of users associated with the different mobile stations and/or a particular policy applied in controlling access to certain information. Here, different access policies may apply based on particular individual users operating the mobile stations. For example, different access policies may be applied based upon particular roles within an enterprise, different levels of customer loyalty according to a loyalty classification, whether access to a particular service has been paid for in advance, etc. Here, access to venue-map and/or infrastructure information may be "tuned" according to particular user attributes, classifications, etc. mapping to particular predetermined privilege levels, and particular access policies being applied. In one implementation, a venue-secured application may use password authentication/authorization to identifying specific users and/or mobile stations that have an enhanced or higher privilege level. In another implementation, mobile stations are configured with predefined credentials according to a certificate mechanism and based on user class.

In one particular application example, an indoor environment served by a venue server may comprise a casino gaming floor. Here, a venue-secured application hosted on mobile stations may access a venue server operated by a casino through WLAN infrastructure. As discussed above, such a venue-secured application may further restrict dissemination of information obtained from the venue server to other entities on a mobile station based, at least in part, on a privilege level attributed to the mobile station. In a particular implementation, such a privilege level may be defined at least in part by whether the mobile station is associated with or being used by a customer, employee, manager or casino executive.

In one particular implementation, a privilege level of a customer may be further defined based, at least in part, on whether the customer is a preferred or VIP customer. For example, a venue-secured application hosted on a mobile station attributed to a customer incrementally affect or "tune" one or more qualities of a position engine based upon whether the customer is an ordinary customer, preferred customer or VIP customer. Preferred or VIP customers, for example, may receive a higher quality position estimates than position estimates received by ordinary customers. Such higher quality position estimates may be achieved by applying additional resources to more accurate or precise position estimates including, for example, processing resources to perform map matching and/or position filtering. Such additional resources may be applied, for example, by exposing unique interfaces to heterogeneous computing devices such as a graphics processing unit, digital signal processor or multicore processor, just to name a few examples. In another implementation, in addition to a basic service offered to all customers, preferred or VIP customers may receive venue map information descriptive of VIP areas.

In another particular application example, a venue server may provide information to mobile stations to support location based services in an airport terminal area. In one aspect, a venue-secured application hosted on mobile stations associated with members of the general public may restrict dissemination of venue map and/or other infrastructure description so as to exclude areas that are not accessible to the general public. A venue-secured application hosted on mobile stations associated with airport employees, on the other hand, may permit dissemination of venue map and/or other infrastructure description to include all areas of the airport terminal. While this is just one example of defining different privilege levels for employees and members of the public, additional privilege levels may be attributed to different classes of users. For example, a venue-secured application may further define different privileges (and hence different area restrictions on venue map and/or other infrastructure description) for TSA personnel, airline personnel, janitorial staff, information technology personnel, just to name a few examples.

In another aspect, in addition to restricting dissemination of information received from a venue server to other entities hosted on a mobile station, a venue-secured application may affect how information is presented on a mobile station based, at least in part, on a user classification. For example, if a user of a mobile station is a passenger, a venue-secured application hosted on the mobile station may highlight or emphasize particular points of interest such as, for example, pre-boarding security, ticketing, gates, eating establishments, just to name a few examples.

In a particular implementation, a mobile station at an airport may receive access to information provided by a venue server following authentication of the mobile station using any one of several authentication techniques. In addition to authentication, a venue server operated by the airport or port authority may collect a fee from a user of the mobile station in exchange for access to venue map and/or other infrastructure information.

As used herein, the term "access point" is meant to include any wireless communication station and/or device used to facilitate communication in a wireless communications system, such as, for example, a wireless local area network, although the scope of claimed subject matter is not limited in this respect. Similarly, the term "access point" is meant to include a "base station" that may facilitate wireless communication in a cellular telephone network, for example. In another aspect, an access point may comprise a wireless local area network (WLAN) access point, for example. Such a WLAN may comprise a network compatible with one or more versions of IEEE standard 802.11 in an aspect, although the scope of claimed subject matter is not limited in this respect. A WLAN access point may provide communication between one or more mobile stations and a network such as the Internet, for example. In another example, an access point may comprise a "femtocell" to provided access to a cellular network through a broadband connection such as, for example, a Digital Subscriber Line (DSL), cable, or the like. In this context, a femtocell may utilize or otherwise be compatible with various types of communication technology, such as, for example, Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), Code division multiple access (CDMA)-2000, or Time Division Synchronous Code Division Multiple Access (TD-SCDMA), just to name a few among many possible.

As used herein, the term "mobile station" (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processor and/or computing platform adapted to perform functions controlled by machine-readable instructions.

Figure 5:
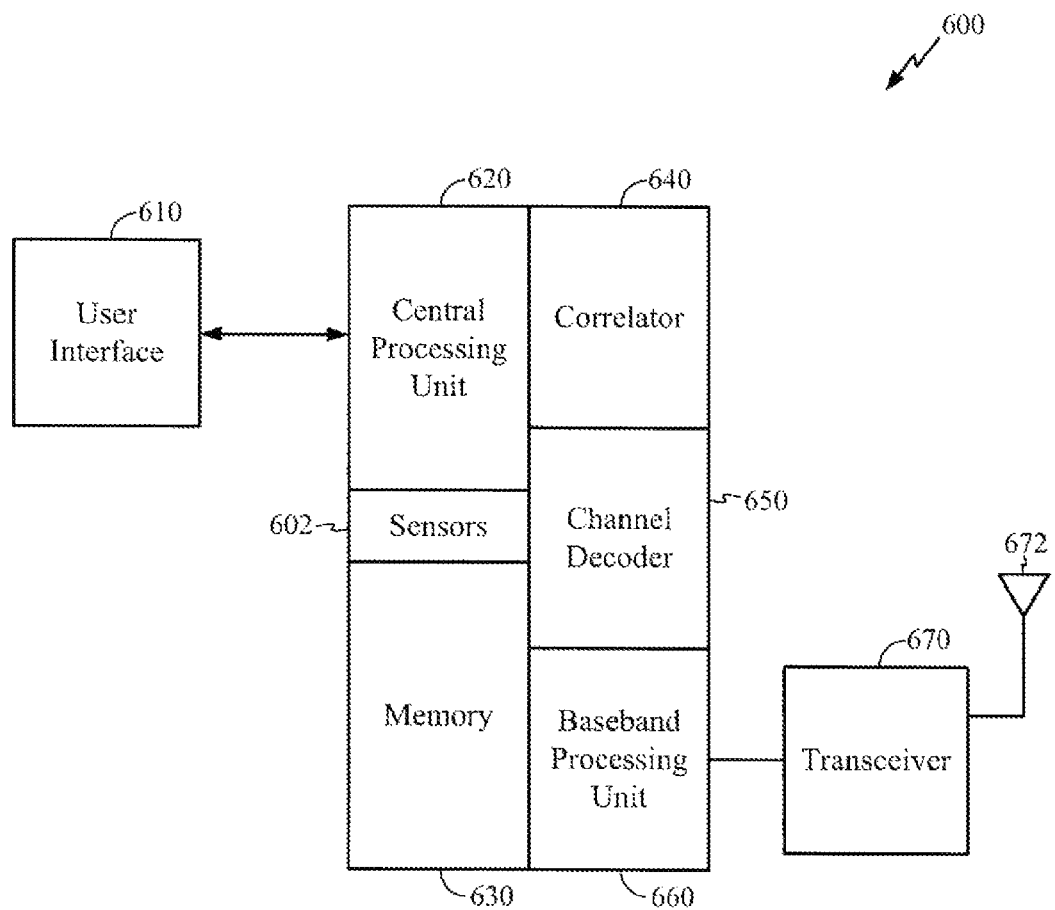
FIG. 5 is a schematic block diagram depicting a mobile station in accordance with an implementation.

FIG. 5 is a block diagram illustrating example mobile station 600 that may be adapted to perform any of the example techniques described herein related to mobile stations. For example, mobile station 600, as described previously, may perform trilateration calculations based on one or more wireless signal characteristics received at the mobile station to determine an initial estimated location for the mobile station. Mobile station 600 may further communicate with other system resources, such as, for example, a venue server, as depicted in FIG. 1. Of course, these are merely example functions of mobile station 600, and the scope of claimed subject matter is not limited in this respect.

In an aspect of example mobile station 600, one or more radio transceivers 670 may be adapted to modulate an RF carrier signal with baseband information, such as voice or data, onto an RF carrier, and demodulate a modulated RF carrier to obtain such baseband information. An antenna 672 may be adapted to transmit a modulated RF carrier over a wireless communications link and receive a modulated RF carrier over a wireless communications link.

A baseband processor 660 may be adapted to provide baseband information from a central processing unit (CPU) 620 to transceiver 670 for transmission over a wireless communications link. Here, CPU 620 may obtain such baseband information from an input device within a user interface 610. Baseband processor 660 may also be adapted to provide baseband information from transceiver 670 to CPU 620 for transmission through an output device within user interface 610.

User interface 610 may comprise a plurality of devices for inputting or outputting user information such as voice or data. Such devices may include, by way of non-limiting examples, a keyboard, a display screen, a microphone, and a speaker.

Transceiver 670 may provide demodulated information to correlator 640. Correlator 640 may be adapted to derive beacon-related correlation functions from information relating to beacon signals provided by transceiver 670. This information may he used by mobile station 600 to acquire wireless communications services, for example from a wireless access point. Channel decoder 650 may be adapted to decode channel symbols received from baseband processor 660 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 650 may comprise a turbo decoder.

A memory 630 may be adapted to store machine-readable instructions which may be executable to perform one or more of processes, implementations, or examples thereof which are described or suggested herein. CPU 620 may access and execute such machine-readable instructions, thereby enabling mobile station 600 to perform one or more of the processes, implementations, and/or examples described and/or suggested above. Mobile station may also comprise one or more sensors 602, such as, for example, an accelerometer or a gyroscope. Of course, mobile station 600 is merely an example, and the scope of claimed subject matter is not limited to the specific configuration of components and/or functional units depicted.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by a processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Wireless communication techniques described herein may be implemented using various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

The term "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method comprising:
receiving venue infrastructure information at a first entity hosted on a mobile station, wherein said first entity comprises at least one of a venue-secured application or a system service; and
selectively providing a portion of said venue infrastructure information received at said first entity to one or more other entities hosted on said mobile station based, at least in part, on a privilege level attributed to said mobile station or user associated with said mobile station,
wherein at least one of said one or more other entities comprises a location engine service capable of estimating a position of said mobile station based, at least in part, on said provided portion of said venue infrastructure information, and
wherein said venue infrastructure information comprises at least one of venue map information or information descriptive of at least one location of a radio frequency (RF) beacon transmitter in a venue.

2. The method of claim 1, wherein said provided portion include said information descriptive of at least one location of an RF beacon transmitter in said venue and excludes said venue map information, the method further comprising estimating one or more trajectories of said mobile station by a venue-secured application.

3. The method of claim 1, wherein said venue infrastructure information includes said information descriptive of said at least one location of an RF beacon transmitter, and further comprising: preventing dissemination of said information descriptive of said at least one location of an RF beacon transmitter to said other entities; receiving, at a venue-secured application, measurements of ranges from three or more radio frequency beacon transmitters from a location engine service; and estimating, at said venue-secured application, said position of said mobile station based, at least in part, on said measurements and information descriptive of at least one location of an RF beacon transmitter.

4. The method of claim 1, and further comprising determining said provided portion based, at least in part, according to a monetization or subscription model.

5. The method of claim 1, wherein said privilege level is based, at least in part, on a loyalty classification associated with said user.

6. The method of claim 1, wherein said privilege level is based, at least in part, on a classification of said user's role in an enterprise.

7. The method of claim 1, wherein said privilege level is further associated with an application hosted on said mobile device.

8. An article of manufacture comprising:
a storage medium comprising machine readable instructions stored thereon which are executable by a special purpose computing device in a mobile station to:
access venue infrastructure information received at said mobile station from a venue server; and
selectively provide a portion of said venue infrastructure information to one or more entities hosted on said mobile station based, at least in part, on a privilege level attributed to said mobile station or user associated with said mobile station,
wherein at least one of said one or more entities comprises a location engine service capable of estimating a position of said mobile station based, at least in part, on said provided portion of said venue infrastructure information, and
wherein said venue infrastructure information comprises at least one of venue map information or information descriptive of at least one location of a radio frequency (RF) beacon transmitter in a venue.

9. The article of manufacture of claim 8, wherein said instructions are further executable by said special purpose computing device to determine said provided portion based, at least in part, according to a monetization or subscription model.

10. The article of manufacture of claim 8, wherein said provided portion include said information descriptive of at least one location of an RF beacon transmitter in said venue and excludes said venue map information, and wherein said instructions are further executable by said special purpose computing device to estimate one or more trajectories of said mobile station by a venue-secured application.

11. The article of manufacture of claim 8, wherein said instructions are further executable by said special purpose computing device to: prevent dissemination of said information descriptive of said at least one location of an RF beacon transmitter to said other entities; obtain, at a venue-secured application measurements of ranges from three or more radio frequency beacon transmitters from said location engine; and estimate, at said venue-secured application, said position of said mobile station based, at least in part, on said measurements and information descriptive of at least one location of an RF beacon transmitter.

12. The article of manufacture of claim 8, wherein said privilege level is based, at least in part, on a loyalty classification associated with said user.

13. The article of manufacture of claim 8, wherein said privilege level is based, at least in part, on a classification of said user's role in an enterprise.

14. An apparatus comprising:
means for receiving venue infrastructure information at a first entity hosted on a mobile station, wherein said first entity comprises at least one of a venue-secured application or a system service; and
means for selectively providing a portion of said venue infrastructure information received at said first entity to one or more other entities hosted on said mobile station based, at least in part, on a privilege level attributed to said mobile station or user associated with said mobile station,
wherein at least one of said one or more entities comprises a location engine service capable of estimating a position of said mobile station based, at least in part, on said provided portion of said venue infrastructure information, and
wherein said venue infrastructure information comprises at least one of venue map information or information descriptive of at least one location of a radio frequency (RF) beacon transmitter in a venue.

15. The apparatus of claim 14, and further comprising: means for preventing dissemination of said information descriptive of said at least one location of an RF beacon transmitter to said other entities; means for receiving, at a venue-secured application, measurements of ranges from three or more radio frequency beacon transmitters from a location engine service; and means for estimating, at said venue-secured application, said position of said mobile station based, at least in part, on said measurements and information descriptive of at least one location of an RF beacon transmitter.

16. A mobile station comprising:
a receiver to receive signals from a communication network; and
a processor to host a first entity, wherein said first entity comprises at least one of a venue-secured application or a system service;
wherein said first entity is configured to:
access venue infrastructure information obtained from signals received at said receiver from a venue server; and
selectively provide a portion of said venue infrastructure information received at said first entity to one or more other entities hosted on said processor based, at least in part, on a privilege level attributed to said mobile station or user associated with said mobile station,
wherein at least one of said one or more other entities comprises a location engine service capable of estimating a position of said mobile station based, at least in part, on said provided portion of said venue infrastructure information, and
wherein said venue infrastructure information comprises at least one of venue map information or information descriptive of at least one location of a radio frequency (RF) beacon transmitter in a venue.

17. The mobile station of claim 16, wherein said provided portion is selected, at least in part, according to a monetization or subscription model.

18. The mobile station of claim 16, wherein said provided portion includes said information descriptive of at least one location of an RF beacon transmitter in said venue and excludes said venue map information, and wherein said first entity is further to estimate one or more trajectories of said mobile station.

19. The mobile station of claim 16, wherein said venue infrastructure information includes said information descriptive of said at least one location of an RF beacon transmitter, and wherein said first entity is further to: prevent dissemination of said information descriptive of said at least one location of an RF beacon transmitter to said one or more other entities; obtain measurements of ranges from three or more radio frequency beacon transmitters from said location engine; and estimate said position of said mobile station based, at least in part, on said measurements and information descriptive of at least one location of an RF beacon transmitter.

20. The mobile station of claim 16, wherein said privilege level is based, at least in part, on a loyalty classification associated with said user.

21. The mobile station of claim 16, wherein said privilege level is based, at least in part, on a classification of said user's role in an enterprise.

22. The mobile station of claim 16, wherein venue infrastructure information comprises a location of at least one femtocell.

* * * * *